United States Patent [19]

Horiuchi et al.

[11] Patent Number: 5,208,203
[45] Date of Patent: * May 4, 1993

[54] DIESEL ENGINE EXHAUST GAS-PURIFYING CATALYST

[75] Inventors: Makoto Horiuchi; Koichi Saito, both of Himeji, Japan

[73] Assignee: Nippon Shokubai Co., Ltd., Osaka, Japan

[*] Notice: The portion of the term of this patent subsequent to Dec. 10, 2008 has been disclaimed.

[21] Appl. No.: 812,941

[22] Filed: Dec. 24, 1991

[30] Foreign Application Priority Data

Jan. 7, 1991 [JP] Japan ................................ 3-000201

[51] Int. Cl.$^5$ .................. B01J 21/06; B01J 23/56; B01J 23/58; B01J 23/60
[52] U.S. Cl. .................................. 502/302; 502/339; 502/325; 502/329; 502/330; 502/328; 502/331; 502/332; 502/303; 502/304; 502/333; 502/334; 423/215.5
[58] Field of Search ............... 502/339, 325, 302, 330, 502/328, 331, 329, 332, 303, 304, 333, 334; 423/215.5

[56] References Cited

U.S. PATENT DOCUMENTS 4,849,399  7/1989  Joy, III et al. ................. 502/325 X
5,000,929  3/1991  Horiuchi et al. ............ 423/215.5 X
5,071,816 12/1991  Horiuchi et al. ..................... 502/302

FOREIGN PATENT DOCUMENTS 0315896  5/1989  European Pat. Off. .
0397411 11/1990  European Pat. Off. .
  24597  2/1980  Japan .
  82944  5/1984  Japan .
 129030  6/1986  Japan .
 146314  7/1986  Japan .
 149222  7/1986  Japan .
2-293047 12/1990  Japan .
9000439  1/1990  PCT Int'l Appl. .
9005579  5/1990  PCT Int'l Appl. .

OTHER PUBLICATIONS

Hunter, et al., "The Effect of an Oxidation Catalyst on the Physical, Chemical, and Biological Character of Diesel Particulate Emissions" Paper 810263, Detroit, Mich., 1981.

Primary Examiner—W. J. Shine
Assistant Examiner—Douglas J. McGinty
Attorney, Agent, or Firm—Sherman and Shalloway

[57] ABSTRACT

There is provided a Diesel engine exhaust gas-purifying catalyst which comprises (1) a catalytic component comprising titania having dispersed and deposited thereon at least one noble metal selected from palladium, platinum and rhodium, and (2) a refractory three dimensional structure as a carrier. This catalyst is excellent in the performance of removal by combustion at low temperature of harmful components such as uncalcined hydrocarbons and carbon monoxide in addition to carbonic fine particles, and moreover has only low ability to oxide sulfur dioxide, whereby formation of sulfates can be inhibited.

5 Claims, No Drawings

DIESEL ENGINE EXHAUST GAS-PURIFYING CATALYST

This invention relates to a Diesel engine exhaust gas-purifying catalyst

Recently, the adverse impact of emissions of fine particle substances particularly in Diesel engine exhaust gases on the environment and for hygienic reasons has become a recognized problem. These fine particle substances mainly comprise solid carbon fine particles, sulfur fine particles such as sulfate salts, liquid or solid high molecular hydrocarbon fine particles, and the like. Hereinafter, they are generically referred to as "fine particle substances".) The reason is that almost all of these fine particle substances have a particle size of 1 micron or less, and, thus, they easily float in the air and are easily taken into the human body through respiration. Therefore, investigation is being made for making severe the regulations on exhaust of these fine particle substances from Diesel engines.

On the other hand, in accordance with improvements of Diesel engines such as making the pressure of fuel injection higher and control of the timing of fuel injection, the amount of fine particle substances exhausted from a Diesel engine is decreased in some degree. However, the degree of decrease is still not sufficient, and, moreover, components, which are contained in the fine particle substances, composed mainly of liquid high molecular hydrocarbons and soluble in organic solvents (SOF), cannot be removed by such improvement of engines as above, resulting in increase of the rate of SOF in the fine particle substances. Since the SOF contains harmful components such as carcinogens, removal of SOF as well as fine particle substances is now an important problem.

As a method for removing fine particle sub-substances, a catalytic method has hitherto been investigated which comprises catching the fine particle substances in exhaust gas from a Diesel engine by use of a catalyst comprising a refractory three dimensional structure, such as ceramic foam, wire mesh, metal foam, wall flow-type ceramic honeycomb, open flow type ceramic honeycomb or metal honeycomb, having deposited thereon a catalytic substance capable of burning carbonic fine particles, and removing the carbonic fine particles either under the exhaust conditions (gas composition and temperature) of exhaust gas obtained under the usual running conditions of a Diesel engine or by use of a heating means such as an electric heater.

As a catalyst for purification of exhaust gases from Diesel engines, performances are in general desired that (a) it has high efficiency of removal by combustion at low temperature of harmful components such as unburned hydrocarbons and carbon monoxide as well as carbonic fine particles, (b) it has only low ability of oxidation of sulfur dioxide ($SO_2$), derived from sulfur components contained in a large amount in light oil to be used as fuel, to sulfur trioxide ($SO_3$), whereby formation of sulfates (sulfur trioxide or sulfuric acid mist formed by oxidation of sulfur components contained in a large amount in light oil to be used as fuel, to sulfur trioxide ($SO_3$), whereby formation of sulfates (sulfur trioxide or sulfuric acid mist formed by oxidation of sulfur dioxide) can be inhibited, and (c) it can withstand continuous running under high load (namely having high durability at high temperature).

Heretofore, various proposals have been made for the purpose of enhancing the efficiency of removal by combustion of carbonic fine particles. For example, Japanese Laid-Open Patent Publication No. 24,597/1980 discloses, as platinum group element catalysts, a rhodium (7.5 %)-platinum alloy, a platinum/palladium (50/50) mixture, a catalyst comprising tantalum oxide or cerium oxide having deposited thereon palladium, an alloy comprising palladium and 75 % by weight or less of platinum, etc. These catalysts are stated to be also effective for removal of SOF.

Further, Japanese Laid-Open Patent Publication Nos. 129,030/1986, 149,222/1986 and 146,314/1986 disclose catalytic compositions comprising palladium and rhodium, as main active components, having added thereto an alkali metal, an alkaline earth metal, copper, lanthanun, zinc and manganese and the like, and Japanese Laid-Open Patent Publication 82,944/1984 discloses a catalytic composition comprising a combination of at least one metal selected from copper, an alkali metal, molybdenum and vanadium and at least one metal selected from platinum, rhodium and palladium.

Further, as a catalyst removing SOF in Diesel engine exhaust gases is reported an open type honeycomb-shaped noble metal oxidizing catalyst having through holes in parallel to the gas flow (SAE Paper, 810263).

However, although all of the above usual catalysts are effective in some degree for removal of carbonic fine particles by combustion or removal of SOF, they have disadvantages that, due to their high ability of oxidation of sulfur dioxide, the amount of sulfates formed increases, the rate of removal of the total fine particle substances rather lowers, and these sulfates cause a new environmental problem.

Namely, a catalyst has not yet been found fully satisfying the performances of the above (a), (b) and (c) required for Diesel engine exhaust gas-purifying catalysts and performance for SOF removal.

Thus, an object of this invention is to provide a Diesel engine exhaust gas-purifying catalyst capable of efficiently removing fine particle substances in Diesel engine exhaust gases.

Another object of the invention is to provide a Diesel engine exhaust gas-purifying catalyst which has a performance capable of removing by combustion even at low temperature harmful components such as unburned hydrocarbons and carbon monoxide as well as carbonic fine particles in Diesel engine exhaust gases, and, in addition, has only low ability to oxidize sulfur dioxide and thus can inhibit formation of sulfates Another object of the invention is to provide a Diesel engine exhaust gas-purifying catalyst capable of efficiently removing SOF in Diesel engine exhaust gases.

Still another object of the invention is to provide a Diesel engine exhaust gas-purifying catalyst which has good high temperature durability and can be charged into a Diesel car without causing any practical problem.

As a result of intense study, the present inventors found that a catalyst can accomplish the above objects which comprises a refractory three dimensional structure having deposited thereon a catalytic component comprising titania having dispersed and deposited thereon at least one noble metal selected from palladium, platinum and rhodium.

Thus, in accordance with this invention, there is provided a Diesel engine exhaust gas-purifying catalyst which comprises a refractory three dimensional structure having deposited thereon a catalytic component comprising titania having dispersed and deposited thereon at least one noble metal selected from palladium, platinum and rhodium.

In the catalyst of the invention, the catalytic component comprises titania having deposited thereon at least one noble metal selected from palladium, platinum and rhodium. By use of titania as a carrier substrate of noble metal, effects are specifically exhibited, for example, that harmful components such as SOF, unburned hydrocarbons and carbon monoxide can be purified even at low temperature, and formation of sulfates can be inhibited due to low ability of the catalyst to oxidize sulfur dioxide (hereinafter, this effect is referred to as "sulfur dioxide oxidation inhibition effect").

For example, catalysts using alumina as a depositing substrate have an effect to purify harmful substances such as SOF, unburned hydrocarbons and carbon monoxide in Diesel engine exhaust gases. However, in treatment of exhaust gases of 350° C. or more, due to the high ability thereof to oxidize sulfur dioxide, oxidation of sulfur dioxide takes place specifically at the time of elevation of the temperature, particularly of Diesel engine exhaust gases, and sulfates are formed, resulting in increase of fine particle substances. Further, catalysts using silica as a depositing substrate exhibit only strikingly lowered ability to oxidize harmful components such as SOF, unburned hydrocarbons and carbon monoxide.

Physical properties of titania to be used as a depositing substrate in the invention are not particularly limited, but in actual application to Diesel cars, it is preferred to use titania having a specific surface area in the range of 1 to 82 $m^2/g$, preferably 5 to 60 $m^2/g$.

When titania having a specific surface area below 1 $m^2/g$ is used, the dispersibility of palladium, platinum and rhodium is lowered, the ability to oxidize at low temperature harmful components such as SOF, unburned hydrocarbons and carbon monoxide is lowered, and the effect to inhibit oxidation of sulfur dioxide is also lowered. On the other hand, titania having a specific surface area above 80 $m^2/g$ is not desirable, because it is not thermally stable and thermally induced changes in Diesel engine exhaust gases, for example in peeling from the three dimensional structure.

In preparation of the catalyst of the invention, there can be used, as starting materials of palladium, palladium nitrate, palladium chloride, palladium tetramine chloride, palladium sulfide complex salts, etc. As starting materials of platinum, there can be used chloroplatinic acid, dinitrodiaminoplatinum, platinum tetramine chloride, platinum sulfide complex salts, etc. Further, as starting materials of rhodium, there can be used rhodium nitrate, rhodium chloride, hexaamminerhodium chloride, rhodium sulfide complex salts, etc.

The catalyst of the invention can be obtained by depositing on a refractory three dimensional structure a catalytic component comprising titania having dispersed and deposited thereon at least one noble metal selected from palladium, platinum and rhodium.

As this refractory three dimensional structure, there can be used ceramic foam, open flow ceramic honeycomb, wall flow type honeycomb monolith, open flow metal honeycomb, metal foam, metal mesh or the like. Particularly when the Diesel engine exhaust gas contains fine particle substances in an amount of 100 mg or less per $m^3$ of the exhaust gas and the SOF content of the fine particle substances is 20 % or more, open flow type ceramic honeycomb or open flow type metal honeycomb is preferably used as the refractory three dimensional structure.

Further, in order to enhance high temperature durability or control oxidizing ability, the above catalytic component in the catalyst of the invention may contain, if necessary, at least one element selected from the group consisting of scandium, yttrium, rare earth elements such as lanthanum, cerium, praseodymium and neodymium, alkal metals such as lithium, sodium and potassium, alkaline earth metals such as beryllium, magnesium and calcium, and gold, silver, copper and zinc.

The amounts of titania, palladium, platinum and rhodium to be deposited in the catalyst of the invention are preferably 5 to 200 g, 0 to 6 g, 0 to 6 g and 0 to 3 g, respectively, per liter (hereinafter expressed by L) of the refractory three dimensional structure. Preferably, the ratio in deposited amount of at least one noble metal selected from palladium, platinum and rhodium to titania (noble metal/titania weight ratio) is in the range of 0.001/1 to 0.2/1.

The deposition amount of the above element to be added to the catalytic component according to necessity is preferably 50 g or less in terms of its oxide per L of the refractory three dimensional structure.

There is no particular limitation about methods for preparing the catalyst of the invention, and it can, for example, be prepared by the following methods.

(1) Fine particles of titania are slurried by wet grinding. A refractory three dimensional structure is dipped in the slurry, and, after removal of excess slurry, dried at 80° to 250° C. and then calcined at 300° to 850° C. The refractory three dimensional structure is dipped in an aqueous solution containing a certain amount of a noble metal compound, and, after removal of excess solution, dried at 80° to 250° C. and then calcined at 300° to 850° C. to obtain a desired catalyst.

(2) Titania is put in an aqueous solution containing a certain amount of a noble metal compound to impregnate it therewith. The resulting titania is dried at 80° to 250° C. and then calcined at 300° to 850° C. to disperse and deposit the noble metal component on titania. The titania fine particles having deposited thereon the above noble metal component is slurried by wet pulverizing. A refractory three dimensional structure is dipped in this slurry, and, after removal of excess slurry, dried at 80° to 250° C. and calcined at 300° to 850° C. to obtain a desired catalyst.

The catalyst of the invention is excellent in performance to remove by combustion at low temperature harmful components such as uncalcined hydrocarbons and carbon monoxide as well as carbonic fine particles, and, in addition, due to its low ability to oxidize sulfur dioxide, formation of sulfates can be inhibited. Thus, the catalyst of the invention is excellent in lowering the amount of fine particle substances in Diesel engine exhaust gases, and by use of the catalyst of the invention it is possible to efficiently purify Diesel engine exhaust gases.

Further, the catalyst of the invention is also excellent in ability to remove SOF and thus extremely effective for purification of Diesel engine exhaust gases.

In addition, since the catalyst of the invention is also excellent in high temperature durability, it can be charged into a Diesel car without causing any practical problem.

As is seen from the foregoing, the catalyst of the invention is extremely useful as a Diesel engine exhaust gas-purifying catalyst.

This invention is further specifically described below according to examples.

EXAMPLE 1

1 kg of titania having a specific surface area of 35 m$^2$/g was put in an aqueous solution prepared by dissolving 20 g in terms of palladium of palladium nitrate and 2 g in terms of rhodium of rhodium nitrate in deionized water. After sufficient stirring, the resulting titania was dried at 150° C. for 3 hours and calcined at 500° C. for 2 hours to obtain titania fine particles having dispersed and deposited thereon palladium and rhodium. 1 kg of the titania fine particles were slurried by wet grinding.

In the thus obtained slurry was dipped a cylindrical cordierite honeycomb carrier of diameter 5.66 inches×length 6.00 inches having about 400 open flow gas flow cells per square inch of the cross section. After removal of excess slurry, the carrier was dried at 150° C. for 2 hours, and calcined at 500° C. for 1 hour to obtain a catalyst.

The deposited amounts of titania, palladium and rhodium in this catalyst were 50 g, 1 g and 0.1 g per L of the structure.

EXAMPLE 2

1 kg of titania having a specific surface area of 78 m$^2$/g was put in an aqueous solution prepared by dissolving 10 g in terms of palladium of palladium chloride and 1 g in terms of rhodium of hexamminerhodium chloride, 10 g of copper sulfate and 27 g of praseodynium nitrate in deionized water. After sufficient stirring, the resulting titania was dried at 150° C. for 3 hours and calcined at 600° C. for 1 hour to obtain titania fine particles having dispersed and deposited thereon palladium, rhodium, copper oxide and praseodymium oxide.

1 kg of these fine articles were slurried by wet pulverizing, and in the slurry was dipped the same cordierite honeycomb carrier as used in Example 1. After removal of excess slurry, the carrier was dried at 150° C. for 2 hours and then calcined at 400° C. for 1 hour to obtain a catalyst.

The deposited amounts of titania, palladium, rhodium copper oxide (CuO) and praseodymium oxide (Pr$_6$O$_{11}$) in this catalyst were 100 g, 1 g, 0.1 g, 0.5 g and 1 g, respectively, per L of the structure.

EXAMPLE 3

1 kg of titania having a specific surface area of 15 m$^2$/g was put in an aqueous solution of 40 g in terms of platinum of chlorplatinic acid and 10 g in terms of rhodium of rhodium nitrate. After sufficient stirring, the titania was dried at 180° C. for 2 hours and then calcined at 700° C. for 1 hour to obtain titania fine particles having dispersed and deposited thereon platinum and rhodium.

500 g of these fine particles were slurried by wet pulverizing and in this slurry was dipped the same cordierite honeycomb carrier as used in Example 1. After removal of excess slurry, the carrier was dried at 150° C. for 3 hours and then calcined at 800° C. for 1 hour to obtain a catalyst.

The deposited amounts of titania, platinum and rhodium in this catalyst were 10 g, 0.4 g and 0.1 g, respectively, per L of the structure.

EXAMPLE 4

1 kg of titania having a specific surface area of 120 m$^2$/g was put in an aqueous solution containing 14.3 g in terms of palladium of palladium sulfide complex salt, 37.6 g of silver nitrate and 522 g of zinc nitrate. After sufficient stirring, the titania was dried at 150° C. for 3 hours and calcined at 500° C. for 1 hour to obtain titania fine particles having dispersed and deposited thereon palladium, silver oxide and zinc oxide.

1 kg of these fine particles were slurried by wet pulverizing and in this slurry was dipped the same cordierite honeycomb carrier as used in Example 1. After removal of excess slurry, the titania was dried at 150° C. for 2 hours and calcined at 750° C. for 1 hour to obtain a catalyst.

The deposition amounts of titania, palladium, silver oxide (Ag$_2$O) and zinc oxide (ZnO) in this catalyst were 70 g, 1 g, 2 g and 10 g, respectively, per L of the structure.

EXAMPLE 5

1 kg of titania having a specific surface area of 6 m$^2$/g was slurried by wet pulverizing and in this slurry was dipped the same cordierite honeycomb carrier as used in Example 1. After removal of excess slurry, the carrier was dried at 150° C. for 3 hours and calcined at 500° C. for 1 hour to obtain a structure having deposited thereon zirconia.

This structure was dipped in 2.5 L of an aqueous solution prepared by dissolving in deionized water 10.5 g in terms of palladium of palladium oxide, 10.5 g in terms of platinum of dinitrodiaminoplatinum and 110 g of samarium nitrate. After removal of excess solution, the structure was dried at 150° C. for 3 hours and calcined at 500° C. for 2 hours to obtain a catalyst.

The deposited amounts of titania, palladium, platinum, and samarium oxide (Sm$_2$O$_3$) in this catalyst were 25 g, 0.5 g, 0.5 g and 2 g, respectively, per L of the structure.

EXAMPLE 6

1 kg of titania having a specific surface area of 52 m$^2$/g was put in an aqueous solution containing 20 g in terms of palladium of palladium nitrate and 528 g of praseodymium nitrate. After sufficient stirring, the titania was dried at 150° C. for 3 hours and calcined at 500° C. for 1 hour to obtain titania fine particles having dispersed and deposited thereon platinum and praseodymium oxide.

1 kg of these fine particles were slurried by wet pulverizing, and in this slurry was dipped a cylindrical stainless steel honeycomb carrier of diameter 5.66 inches×length 6.0 inches having about 400 open flow gas flow cells per square inch of the cross section. After removal of excess slurry, the carrier was dried at 150° C. for 2 hours and then calcined at 500° C. for 1 hour to obtain a catalyst having deposited thereon titania-platinum praseodymium oxide fine particles.

The deposited amounts of titania, platinum and praseodymium oxide in this catalyst were 50 g, 1 g and 10 g, respectively, per L of the structure.

EXAMPLE 7

1 kg of titania having a specific surface area of 40 m$^2$/g was put in an aqueous solution prepared by dissolving in deionized water 80 g in terms of palladium of palladium nitrate and 8 g in terms of rhodium of rhodium nitrate. After sufficient stirring, the titania was dried at 150° C. for 3 hours and then calcined at 500° C. for 2 hours to obtain titania-palladium-rhodium fine particles.

500 g of these fine particles were slurried by wet pulverizing to obtain a slurry containing titania-palladium-rhodium fine particles.

In this slurry was dipped a cylindrical cordierite ceramic foam of diameter 5.66 inches × length 6.00 inches having a cell number such that the number of cells formed with ceramic skeletons is about 12 in a length of 1 inch and having a void percentage of about 90%. After removal of excess slurry, the foam was dried at 150° C. for 2 hours and then calcined at 500° C. for 2 hours to obtain a catalyst having deposited thereon titania-palladium-rhodium fine particles.

The deposited amounts of titania, palladium and rhodium in this catalyst were 25 g, 2 g and 0.2 g, respectively, per L of the structure.

COMPARATIVE EXAMPLE 1

The procedures of Example 1 were repeated, except that silica having a specific surface area of 52 m²/g was used in place of titania in Example 1, to obtain catalyst.

The deposited amounts of silica, palladium and rhodium in the resulting catalyst were 50 g, 1 g and 0.1 g, respectively, per L of the structure.

COMPARATIVE EXAMPLE 2

The procedures of Example 1 were repeated, except that alumina having a specific surface area of 85 m²/g was used in place of titania in Example 1, to obtain a catalyst.

The deposited amounts of alumina, palladium and rhodium in this catalyst were 50 g, 1 g and 0.1 g, respectively, per L of the structure.

COMPARATIVE EXAMPLE 3

The procedures of Example 3 were repeated, except that silica having a specific surface area of 52 m²/g was used in place of titania in Example 3, to obtain a catalyst.

The deposited amounts of silica, platinum and rhodium in this catalyst were 10 g, 0.4 g and 0.1 g, respectively, per L of the structure.

COMPARATIVE EXAMPLE 4

The procedures of Example 3 were repeated, except that alumina having a specific surface area of 85 m²/g was used in place of titania in Example 3, to obtain a catalyst.

The deposited amounts of alumina, palladium and rhodium in this catalyst were 10 g, 0.4 g and 0.1 g, respectively, per L of the structure.

The deposited amount of each component in the catalysts obtained in the above Examples 1 to 7 and comparative examples 1 to 4 are shown in Table 1.

TABLE 1

| | Depositing substrate | | | Nobel metal | | Added element | | Refractory |
|---|---|---|---|---|---|---|---|---|
| | Kind | Specific surface area (m²/g) | Deposited carrier (g/L-carrier) | Component | Deposited carrier (g/L-carrier) | Component | Deposited carrier (g/L-carrier) | three dimensional structure |
| Example | | | | | | | | |
| 1 | TiO₂ | 35 | 50 | Pd/Rh | 1/0.1 | — | — | Ceramic honeycomb |
| 2 | " | 78 | 100 | Pd/Rh | 1/0.1 | CuO Pr₆O₁₁ | 0.5 1.0 | Ceramic honeycomb |
| 3 | " | 15 | 10 | Pt/Rh | 0.4/0.1 | — | — | Ceramic honeycomb |
| 4 | " | 120 | 70 | Pd | 1 | Ag₂O ZnO | 2 10 | Ceramic honeycomb |
| 5 | " | 6 | 25 | Pd/Pt | 0.5/0.5 | Sm₂O₃ | 2 | Ceramic honeycomb |
| 6 | " | 52 | 10 | Pt | 1 | Pr₆O₁₁ | 10 | Metal honeycomb |
| 7 | " | 40 | 25 | Pd/Rh | 2/0.2 | — | — | Ceramic foam |
| Comparative | | | | | | | | |
| 1 | SiO₂ | 52 | 50 | Pd/Rh | 1/0.1 | — | — | Ceramic foam |
| 2 | Al₂O₃ | 85 | 50 | Pd/Rh | 1/0.1 | — | — | " |
| 3 | SiO₂ | 52 | 10 | Pt/Rh | 0.4/0.1 | — | — | " |
| 4 | Al₂O₃ | 85 | 10 | Pt/Rh | 0.4/0.1 | — | — | " |

EVALUATION OF THE CATALYSTS

Each catalyst was evaluated according to the following method for performances to purify a Diesel engine exhaust gas.

In this method were used a supercharged direct injection Diesel engine (4-cylinder, 2800 cc) and as a fuel light oil whose sulfur content was 0.06 weight %.

Each catalyst was charged into the exhaust gas tube from the engine, and a 300 hour direction test was carried out under the conditions of full load engine revolution number of 2500 rpm and a catalyst inlet temperature of 600° C.

The resulting catalyst was exposed to the air for 1 hour under the conditions of an engine revolution number of 2,000 rpm, a torque of 3.0 kg.m and a catalyst inlet temperature of 200° C. The running conditions were changed to those of an engine revolution number of 2,000 rpm and a torque of 14.0 kg.m. Then, the contents of fine particle substances in the exhaust gas at a certain point before entrance to the catalyst bed (inlet) and at a certain point after exit from the catalyst bed (outlet) were measured, under a condition such that the catalyst inlet temperature was settled to be 400° C., according to a usual dilution tunnel method to determine the purification rate (%) of fine particle substances.

Further, the fine particle substances caught using the dilution tunnel method were extracted with a dichloromethane solution. The exhausted amount of SOF was calculated from the change in weight of fine particle substances before and after the extraction and thereby the purification rate of SOF was determined.

Further, analyses of sulfur dioxide, gaseous hydrocarbons and carbon monoxide in the exhaust gas before entering the catalyst bed and in the exhaust gas after passing through the catalyst bed were made simultaneously to determine their conversions (%).

The results are shown in Table 2.

TABLE 2

| Example comparative | Fine particle substance content in the exhaust gas | | Fine particle substance purification rate (%) | Hydrocarbon conversion (%) | Carbon monoxide conversion (%) | Sulfur dioxide conversion (%) | SOF purification rate (%) |
|---|---|---|---|---|---|---|---|
| | Inlet (mg/m³) | Outlet (mg/m³) | | | | | |
| Example | | | | | | | |
| 1 | 32.1 | 22.8 | 28.8 | 90 | 72 | 0.9 | 85 |
| 2 | 31.5 | 21.8 | 30.9 | 92 | 67 | 0.0 | 87 |
| 3 | 30.6 | 22.2 | 27.3 | 87 | 89 | 3.6 | 86 |
| 4 | 33.2 | 25.5 | 23.1 | 82 | 71 | 5.4 | 78 |
| 5 | 29.6 | 22.1 | 25.2 | 88 | 91 | 5.1 | 87 |
| 6 | 30.8 | 22.7 | 26.4 | 94 | 76 | 4.0 | 89 |
| 7 | 31.2 | 20.2 | 35.2 | 89 | 74 | 0.4 | 92 |
| Comparative | | | | | | | |
| 1 | 33.0 | 28.8 | 12.7 | 54 | 32 | 0.8 | 41 |
| 2 | 32.0 | 45.8 | −43.0 | 91 | 76 | 31 | 89 |
| 3 | 31.6 | 32.3 | −2.0 | 53 | 54 | 7.2 | 49 |
| 4 | 30.5 | 56.2 | −84.4 | 72 | 84 | 41 | 11 |

What we claim is:

1. A diesel engine exhaust gas-purifying catalyst which comprises a refractory three dimensional structure having deposited thereon a catalytic component comprising titania having dispersed and deposited thereon at least one noble metal selected from the group consisting of palladium, platinum and rhodium, and at least one additional element selected from the group consisting of scandium, yttrium, rare earth elements, alkali metals, alkaline earth metals, gold, silver, copper and zinc, said titania having a specific surface area in the range of 1 to 60 $m^2/g$, and said additional element being deposited in an amount of 1.5 to 12 g per liter of the refractory three dimensional structure.

2. The catalyst of claim 1 wherein 5 to 200 g of titania, 0 to 6 g of palladium, 0 to 6 g of platinum and 0 to 3 g of rhodium are deposited per liter of the refractory three dimensional structure, provided that the weight ratio of the noble metal/titania is in the range of 0.001/1 to 0.2/1.

3. The catalyst of claim 1 wherein said titania has specific surface area in the range of 5 to 60 $m^2/g$.

4. The catalyst of claim 1 wherein said refractory three dimensional structure is an open flow type ceramic honeycomb or open flow type metal honeycomb.

5. The catalyst of claim 1 whereby the refractory three dimensional structure is a ceramic foam.

* * * * *